US 7,784,079 B1

(12) United States Patent
Sipple et al.

(10) Patent No.: US 7,784,079 B1
(45) Date of Patent: Aug. 24, 2010

(54) VIDEO ON DEMAND TRANSACTION SERVER

(75) Inventors: Ralph E. Sipple, Shoreview, MN (US); James R. McBreen, Shoreview, MN (US); Michael F. Stanton, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 875 days.

(21) Appl. No.: 09/304,406

(22) Filed: May 4, 1999

(51) Int. Cl.
*H04N 7/173* (2006.01)
(52) U.S. Cl. .............................. 725/93; 725/91; 725/92; 725/115; 725/116
(58) Field of Classification Search ............. 725/86–88, 725/91–93, 114–116
See application file for complete search history.

(56) References Cited

U.S. PATENT DOCUMENTS

| | | | | |
|---|---|---|---|---|
| 5,132,992 A * | 7/1992 | Yurt et al. ................... 375/240 |
| 5,519,435 A * | 5/1996 | Anderson ..................... 725/92 |
| 5,555,244 A | 9/1996 | Gupta et al. ................ 370/60.1 |
| 5,570,355 A | 10/1996 | Dial et al. .................. 370/60.1 |
| 5,583,561 A * | 12/1996 | Baker et al. ................. 370/390 |
| 5,600,573 A * | 2/1997 | Hendricks et al. ........... 725/109 |
| 5,612,735 A | 3/1997 | Haskell et al. ................ 348/43 |
| 5,619,256 A | 4/1997 | Haskell et al. ................ 348/43 |
| 5,623,308 A | 4/1997 | Civanlar et al. ............. 348/392 |
| 5,668,841 A | 9/1997 | Haskell et al. ............... 375/371 |
| 5,673,265 A | 9/1997 | Gupta et al. ................ 370/432 |
| 5,675,573 A | 10/1997 | Karol et al. ................. 370/230 |
| 5,691,768 A | 11/1997 | Civanlar et al. ............. 348/392 |
| 5,699,362 A | 12/1997 | Makam ....................... 370/437 |
| 5,710,829 A | 1/1998 | Chen et al. .................. 382/173 |
| 5,724,349 A | 3/1998 | Cloonan et al. ............. 370/390 |
| 5,724,543 A | 3/1998 | Ozden et al. ................ 395/441 |
| 5,740,176 A | 4/1998 | Gupta et al. ................ 370/440 |
| 5,742,343 A | 4/1998 | Haskell et al. .............. 348/415 |
| 5,751,704 A | 5/1998 | Kostic et al. ................ 370/335 |
| 5,754,773 A | 5/1998 | Ozden et al. ........... 395/200.33 |
| 5,764,803 A | 6/1998 | Jacquin et al. .............. 382/236 |
| 5,768,681 A * | 6/1998 | Dan et al. ...................... 725/95 |
| 5,771,435 A * | 6/1998 | Brown ......................... 725/87 |
| 5,781,320 A | 7/1998 | Byers ......................... 359/123 |
| 5,799,017 A | 8/1998 | Gupta et al. ................ 370/419 |
| 5,809,022 A | 9/1998 | Byers et al. ................. 370/395 |
| 5,826,085 A * | 10/1998 | Bennett et al. .............. 719/316 |
| 5,826,110 A | 10/1998 | Ozden et al. ................ 395/865 |
| 5,842,111 A | 11/1998 | Byers ......................... 455/6.3 |
| 5,867,155 A | 2/1999 | Williams .................... 345/327 |
| 5,873,022 A * | 2/1999 | Huizer et al. ................ 725/100 |
| 6,049,823 A * | 4/2000 | Hwang ......................... 725/82 |
| 6,052,555 A * | 4/2000 | Ferguson .................... 725/116 |
| 6,418,557 B1 * | 7/2002 | Otani ........................... 725/96 |
| 6,678,891 B1 * | 1/2004 | Wilcox et al. ................. 725/42 |

* cited by examiner

*Primary Examiner*—Hunter B. Lonsberry
(74) *Attorney, Agent, or Firm*—Robert P. Marley; Nawrocki, Rooney & Silvertson P.A.

(57) ABSTRACT

A method of and apparatus for efficiently providing video on demand services to a cable television subscriber. The provider system consists of two major subsystems. The first subsystem, called a video server, streams video to video on demand subscribers through the cable television network. The second subsystem, called the transaction server, performs virtually all remaining provider functions including, security, accounting, storage and spooling of video data, etc. The transaction server preferably uses a large scale mainframe computer. The video server subsystem may be a partitioned portion of same large scale mainframe computer.

8 Claims, 12 Drawing Sheets

VIDEO ON DEMAND TRANSACTION SERVER

CROSS REFERENCE TO CO-PENDING APPLICATIONS

This application is related to commonly assigned and co-pending U.S. patent application Ser. No. 09/304,906, filed May 4, 1999, and entitled "Video Server"; U.S. patent application Ser. No. 09/304,907, filed May 4, 1999, and entitled "Video on Demand Transaction Gateway"; and U.S. patent application Ser. No. 09/400,647, filed Sep. 21, 1999, and entitled "A Web Based Video on Demand Administration Application", all of which are incorporated by reference.

BACKGROUND OF THE INVENTION

1. Field of the Invention

The present invention generally relates to digital data transmission of video information and more particularly to the delivery of user selected video information to subscribing users.

2. Description of the Prior Art

The mass distribution of video programming signals (i.e., television) was originally accomplished primarily by the broadcasting of a very high frequency (i.e., VHF) carrier containing an amplitude modulated video signal and a frequency modulated audio signal. Through the addition of more broadcasting transmitters, a modest number of different programming signals could be simultaneously distributed to a large number of potential users with a modest capital commitment. Using this technique, the capital commitment increases almost linearly with number of different programming channels within the limits of the available spectrum space for separate and independent carriers.

Within a couple of decades, most of the scarce VHF spectrum space had been committed, and increasing demand for additional programming channels resulted in the allocation of spectrum space in the ultra-high frequency (i.e., UHF) region. Whereas virtually all receivers became UHF compatible, as a matter of policy, and UHF channels were assigned to requesters, it was appreciated that there were no economies of scale through the addition of more broadcast programming channels.

The cable television channel era was the result, wherein a capital commitment was required to wire each user home within a service area. As a result, about one hundred separate programming channels became readily available at a lesser cost than providing the same number of channels using conventional broadcast means. Initially, cable television was simply an analog system in which low power modulated carriers were transferred over a coaxial cable rather than being broadcast into the ether at substantially higher power levels. The cost saving was realized because the broadcasting was accomplished at substantially lower power.

With approximately one hundred different programming channels, it is typical to charge cable service user fees in accordance with a hierarchy of programming channels. The least expensive channels tend to be the preexisting broadcast channels and those cable channels supported primarily by advertisers which are intended for the most general audiences. The subscriber fees to access other channels increase as the programming becomes more specialized, advertising revenue becomes less likely to pay the programming costs, and the programming materials tend to have substantial economic value through other distribution channels. The so-called "premium channels" which show current and/or near current movies without advertising are typical of the higher cost programming options.

Most commercial cable television providers package the various programming channels into programming channel groups with different prices such that a given user can select a suitable programming package and pay the equivalent fee. Typically, a cable provider box, which couples the user television receiver to the coaxial cable source, is controlled by the cable television provider to give access to a given user to only those channels for which the appropriate subscriber fee has been paid.

The most expensive cable television channels currently available are "pay-per-view" or PPV. With the PPV concept, a given user can subscribe to a given programming channel for a single individual program of up to several hours for a separate subscriber fee. Typically, PPV channels provide sporting events and almost current movies.

Perhaps the major disadvantage of the PPV concept as currently implemented, is that the programming is provided in the "broadcast" mode. That means that the programming begins and runs on a predefined schedule. As a result, programming is missed if the user receives a telephone call, for example, during the viewing. Furthermore, it ordinarily requires the user to allocate viewing time to coincide with the predefined schedule. To overcome this disadvantage, many users rent video programs as video cassette recordings (i.e., VCR) from commercial stores which provide such a rental service. This permits the viewer to watch the program in accordance with her/his own schedule, stop the program during interruptions, and replay portions of the program which may not be readily understood. The primary disadvantage of the VCR rental approach is the need to physically go to the rental store to obtain the program and return to the rental store to return the recording.

With the capital commitment for cable television in place, their appear to be substantial new uses for the basic coaxial pathway. Such uses include, telephone, computer modem, facsimile, and video conferencing. To properly coordinate such diverse information transmission activities, attention is being directed to digital transmission schemes which provide for easier management of the distribution resources. U.S. Pat. No. 5,570,355, issued to Dail et al., discusses the handling of a number of diverse information transmissions within a single system. U.S. Pat. No. 5,673,265, issued to Gupta et al., U.S. Pat. No. 5,754,773, issued to Ozden et al., and U.S. Pat. No. 5,799,017, issued to Gupta et al., all discuss multi-media distribution systems. U.S. Pat. No. 5,555,244, issued to Gupta et al., is directed to multimedia distribution to residential users.

The digitization of video results in a great deal of data which must be transferred at a high rate to yield acceptable performance and resolution. By current standards, 3 mbits/sec. is considered to be a very acceptable rate. Such high data rates require systems which can provide high data rate transmission. U.S. Pat. No. 5,724,543, issued to Ozden et al., U.S. Pat. No. 5,699,362, issued to Makam, and U.S. Pat. No. 5,826,110, issued to Ozden et al., all concern themselves with high data rate retrieval and transmission. U.S. Pat. No. 5,675,573, issued to Karol et al., discusses the management of high data rate bandwidths.

In addition to retrieval and transmission of the required high data rates, there is also the need to provide high speed switching for switching as between data sources and destinations. U.S. Pat. No. 5,751,704, issued to Kostic et al., and U.S. Pat. No. 5,740,176, issued to Gupta et al., discuss high speed digital switching systems.

Whether it is data storage and retrieval, data transmission, or data switching, the fundamental technological problem associated with digital video results from the sheer volume of digitized video data and the tremendous rate at which it must be provided to the ultimate user for satisfactory performance. One technique for reduction of the volume problem is in reducing the resolution (and hence the volume of data) for those applications for which such reduction is acceptable. U.S. Pat. No. 5,623,308 and U.S. Pat. No. 5,691,768, both issued to Civanlar et al., directly address the handling of multiple resolution digitized video signals within a single system.

Notwithstanding attempts to reduce the resolutions to the lowest acceptable levels, the total data volume of any commercially useful system will remain high. The most common way to treat extremely high data volumes is through data compression. U.S. Pat. No. 5,710,829, issued to Chen et al., U.S. Pat. No. 5,742,343, issued to Haskell et al., and U.S. Pat. No. 5,619,256, issued to Haskell et al., are concerned with digital compression techniques. Specific attention to compression of digitized video is found in U.S. Pat. No. 5,764,803, issued to Jacquin et al. Compression of 3-dimensional images is treated by U.S. Pat. No. 5,612,735, issued to Haskell et al.

The evolving techniques of digitized video transmission have resulted in a transmission standard, called Asynchronous Transfer Mode (ATM). U.S. Pat. No. 5,668,841, issued to Haskell et al., describes data transmission using the ATM standard. An ATM converter is discussed in U.S. Pat. No. 5,809,022, issued to Byers et al. U.S. Pat. No. 5,724,349, issued to Cloonan et al., suggests an approach to packet switching within an ATM system. An ATM architecture is discussed in U.S. Pat. No. 5,781,320, issued to Byers. Interfacing to ATM systems is addressed in U.S. Pat. No. 5,842,111, issued to Byers.

A solution to the PPV problems noted above utilizing digitized video has been termed, Video on Demand (or VOD). In a VOD system, digitized video programming is made available to individual cable television subscribers in response to specific requests made by the user. U.S. Pat. No. 5,867,155, issued to Williams, describes the use of VOD for a very specialized application. Sea Change, International, has proposed a VOD approach for cable television subscribers. U.S. Pat. No. 5,583,561, issued to Baker et al., assigned to the assignee of the present invention and incorporated herein by reference, discloses and teaches a complete, modern VOD system employing a centralized architecture utilizing an enterprise server developed by Unisys Corporation.

SUMMARY OF THE INVENTION

The present invention overcomes many of the disadvantages found within the prior art by providing a video on demand system which separates the tasks of supplying video to subscribers from the tasks associated with managing the subscriber interface. The key to this approach is to provide an architecture in which the necessary functions are divided into two separate portions. A first subsystem, called a video server, is specifically dedicated to retrieving and transmitting the stream of video information. Virtually no other functions are performed by the video server. A second subsystem, called the transaction server, handles virtually all other functions including control interface with the subscribers, spooling of digitized video data, subscriber accounting, e-mail, facsimile, web access, etc.

The video server has two primary design criteria. First, it must be highly optimized to handle the extremely high input/output data rates. In essence, this is the sole function of the video server, and therefore, the design of the video server hardware and software are most directed towards this characteristic. Because the role of the video subsystem is simplified and single dimensional, video subsystems may employ relatively simple, personal computers or may be implemented within a highly modularized, partitionable large mainframe computer having substantial real time input/output capabilities.

The second major design criterion of the video server subsystem involves modularity. The addition of active subscribers, each viewing individual video programs (or the same program at different times), tends to increase the total input/output load of the video server subsystem linearly. Therefore, there is great economic incentive to design the video server subsystem in such a manner that the hardware resources to implement the video subsystem may be linearly increased in relatively small (and inexpensive) increments. In one embodiment of the present invention, the video server subsystem consists of one or more input/output data rate optimized, industry compatible computers operating under a readily available, commercial operating system, such as Windows NT. Using 3 mbits/second per video stream as a standard, each such device can effectively service thousands of different and independent video streams. Within each video server, storage can be added to handle more video programs and communication interfaces can be added to provide more video streams. Therefore, the same design architecture and components are suitable for a wide range of system sizes, and the capital cost to the video programming supplier can be readily determined as further subscribers are added to the system.

In a second embodiment, the video server subsystem is located within a large scale Unisys mainframe computer platform. Direct interface input/output bridges are utilized to transfer the digitized video data to an ATM network from memory. The number of these direct interface input/output bridges may be easily increased to accommodate increasing subscriber loading. A particular advantage of this embodiment is that digitized video programming can be spooled into and streamed from the same memory. Furthermore, for applications in which the transaction server and video server subsystems may be collocated, additional efficiencies are appreciated.

Unlike the video server subsystem which is optimized to provide a low cost, highly modular approach to a single function, the transaction server is optimized to provide a low cost approach to a wide and highly expandable variety of functions. In fact, all of the functions of the video on demand system, except for the video streaming function performed by the video server, are accomplished by the transaction server. Typical tasks include: transactional interface with the subscribers, subscriber fee accounting, requested program spooling, video server subsystem control, receiving video from a satellite and storing it in an archive, links to other applications such as e-mail, facsimile, the world wide web, etc. Thus, the ideal hardware/software platform for implementation of the transaction server is a readily expandable, highly flexible, high availability, highly recoverable, realtime oriented mainframe system. In the preferred mode of the present invention, the Unisys 2200 is used to host the transaction server.

In accordance with the present invention, a subscribing user transfers a programming request to the transaction server. The transaction server makes the required subscriber accounting entry and notifies the corresponding preloaded video server platform of the new subscriber request. If the asset is not preloaded, in addition to the subscriber accounting, the transaction server must access the request video program and spool it for the video server. Depending upon the rate of use of the requested video program, the data might be stored in memory (for high volume use), on a disk or other mass storage device (for medium volume use), or in some other medium (for low volume use).

In one preferred embodiment of the present invention, the user is permitted to pause, reverse, or fast forward the requested video program though commands entered from the on-set subscriber box. These functions are intended to appear similar to normal VCR commands to the user. These commands are sent to the transaction server which utilizes them to control the corresponding video stream output of the video server subsystem. Thus the user is provided with all of the advantages of VCR rental without the need to physically transport the medium (i.e., cassette tape) back and forth between the rental store and the user site. Additionally, there are no fees for late tape return.

In view of the power and flexibility of the transaction server, other diverse but somewhat related functions may be provided. For example, a user might order a pizza delivery via the on-set subscriber box to transaction server interface, or the user might access the internet, e-mail, or faxes via the transaction server. If this interface is implemented over a readily available, publically accessible, network, such as the internet, many additional functions are possible.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
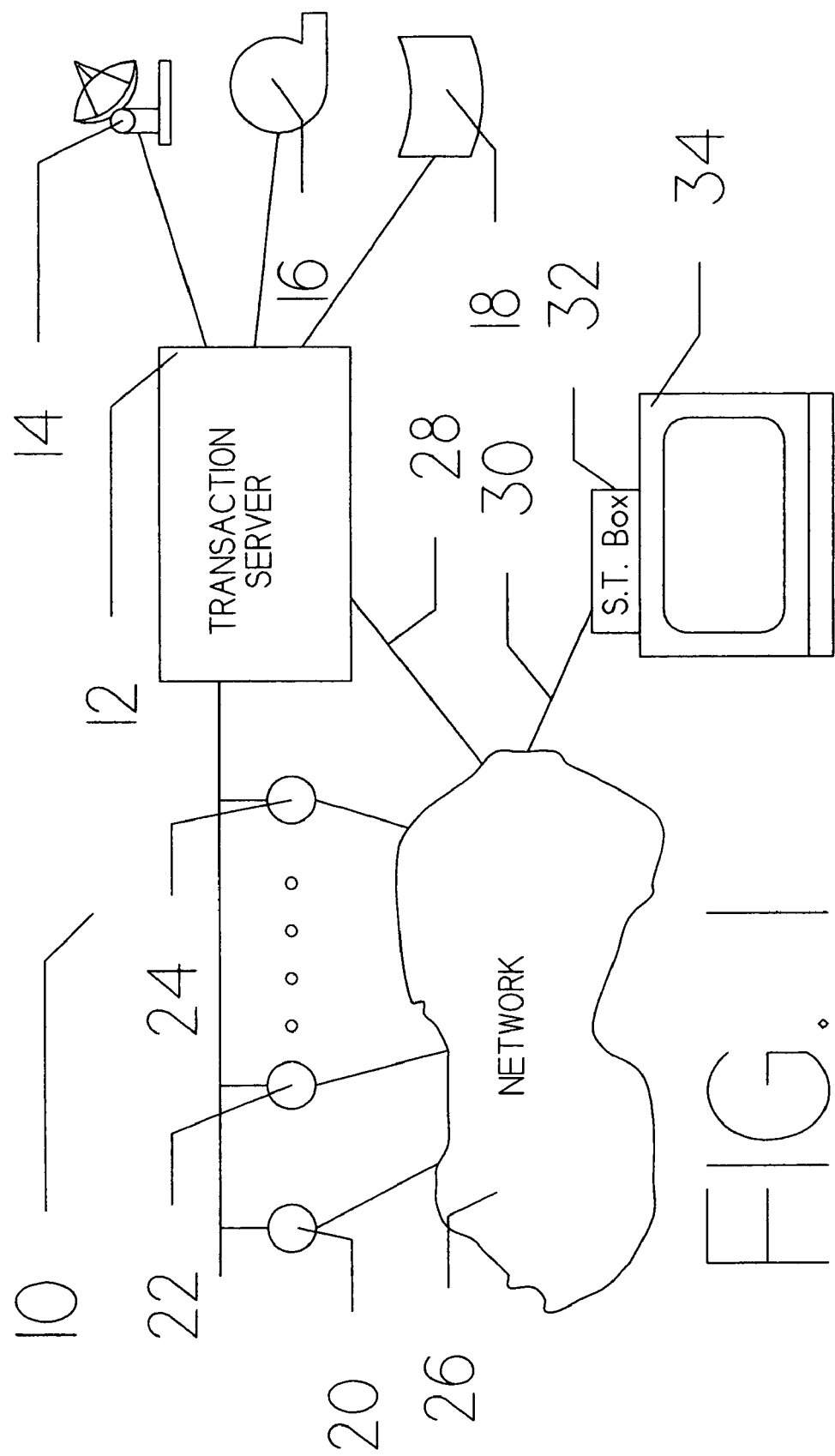
FIG. 1 is a schematic diagram showing the operation of the overall video on demand system of the present invention.

FIG. 1 is a schematic diagram 10 showing the overall video on demand system of the present invention. A subscribing user (not shown) is positioned adjacent standard television receiver 34. Through this television receiver, the user is capable of viewing video programming material transferred to his location via coaxial cable 30 from network 26 in the fashion currently known in the cable television industry. The interface between coaxial cable 30 and standard television receiver 34 is provided by subscriber box 32, which provides the conversion between MPEG II digitized video format and the analog video signal required by television receiver 34.

In many respects, subscriber box 32 is similar to the subscriber boxes utilized with existing cable television systems with the slight functional differences described in more detail below. The basic reason for these slight differences is to permit a subscribing user to communicate with transaction server 12 in a two directional manner. Not only does subscriber box 32 receive video programming data via coaxial cable 30 and present it to television receiver 34, but subscriber box 32 is capable of transferring user requests via coaxial cable 30 and network 26 to transaction server 12 via path 28. The most important requests in accordance with the present invention are those which initiate and control the individualized video on demand programming.

When the user is interested in viewing a particular video program, a request is made from subscriber box 32 and transferred to transaction server 12 via coaxial cable 30, network 26, and path 28. Transaction server 12, a Unisys 2200 system in the preferred embodiment, is provided access to video programming information from satellite receiver 14, from tape video storage 16 and disk mass storage 18. In each instance, the video programming data is stored in digital form. According to the preferred embodiment of the present invention, the MPEG-2 standardized format is utilized.

Whenever a request is received, transaction server 12 checks various security parameters, makes appropriate subscriber billing entries, and generally performs all of the necessary administrative functions as described below in greater detail. Additionally, transaction server 12 spools digital video data for transmission by the video server assigned to the requesting subscriber. One of video server platforms 20, 22, . . . , or 24 is assigned the task by transaction server 12 and the spooled digital video data is supplied via the digital data bus shown. In the preferred mode of the present invention, each video server platform is a separate industry compatible, Windows NT based, computer platform. Once downloaded to the selected video server, the requested video programming is transmitted via network 26 and coaxial cable 30 to subscriber box 32 and television receiver 34. Other distribution methods are available in certain areas including high pass band telephone, etc.

Figure 2:
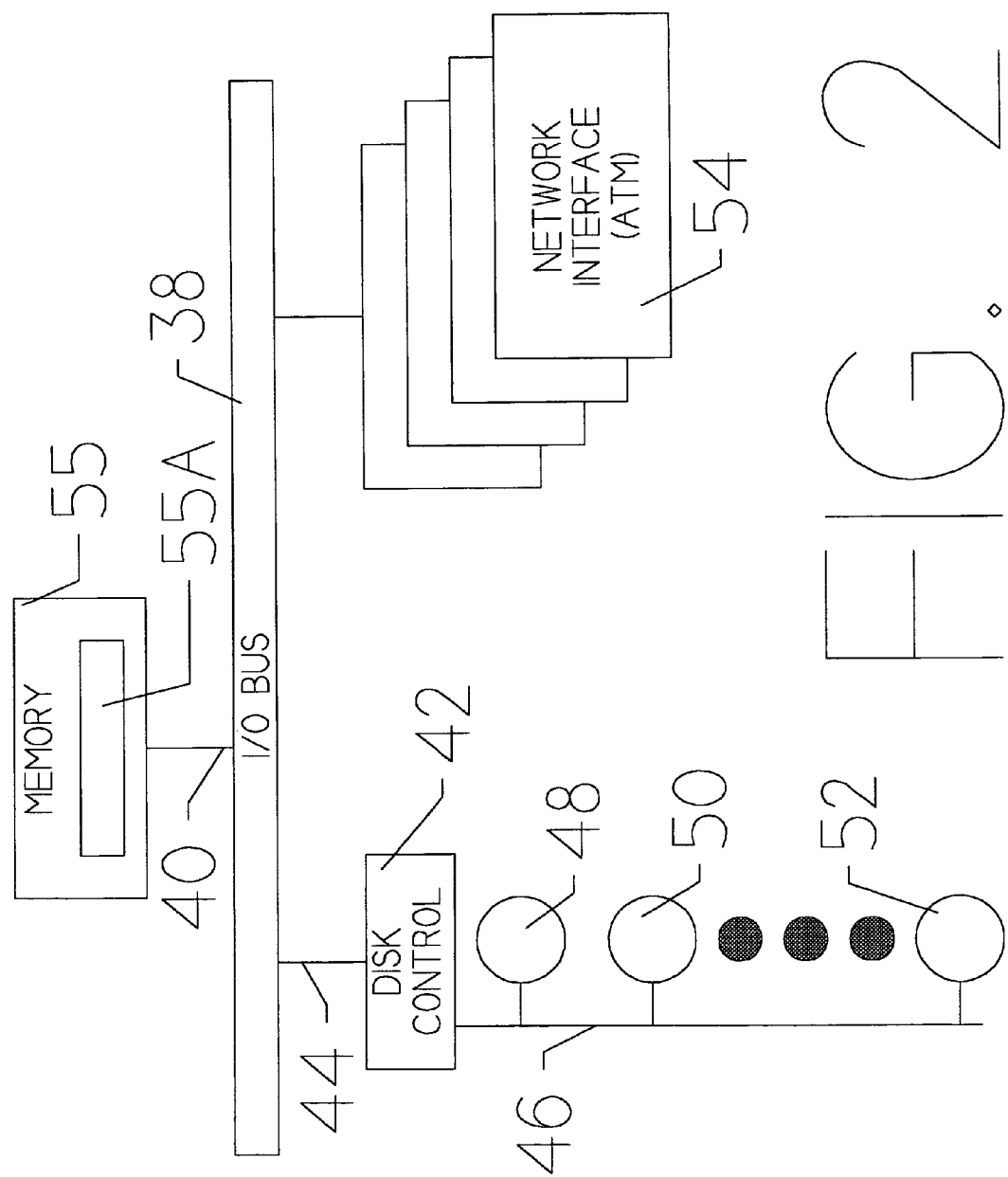
FIG. 2 is a schematic diagram showing spooling of the video programming data from typical mass storage devices.

FIG. 2 is a schematic diagram showing the spooling of data from digital disk mass storage devices. For the preferred mode of the present invention, the digitized video programming data is stored in MPEG-2 format. In the spooling process, the MPEG-2 organized and placed into memory as a programming file 55A. Even though the present invention is independent of bit rates, to produce current commercially acceptable video, 3 mbits/second is required. That means that a two hour video program requires the about 2.7 billion bytes of data storage. Because of cost considerations, many of the programs having low and moderate usage will best be stored on mass storage disk until requested Individual storage disks 48, 50, . . . , and 52 each store a number of video programs in MPEG-2 format. As requested, this data is transferred via storage bus 46 through disk control 42 through I/O bus 38 and placed in memory 55 via path 40. A software program spools the data to the ATM interface 54 at the required speed. This is accomplished by reading the data from disk to memory in blocks (typically not the entire program). The video is then sent to the user in a continuous stream.

Figure 3:
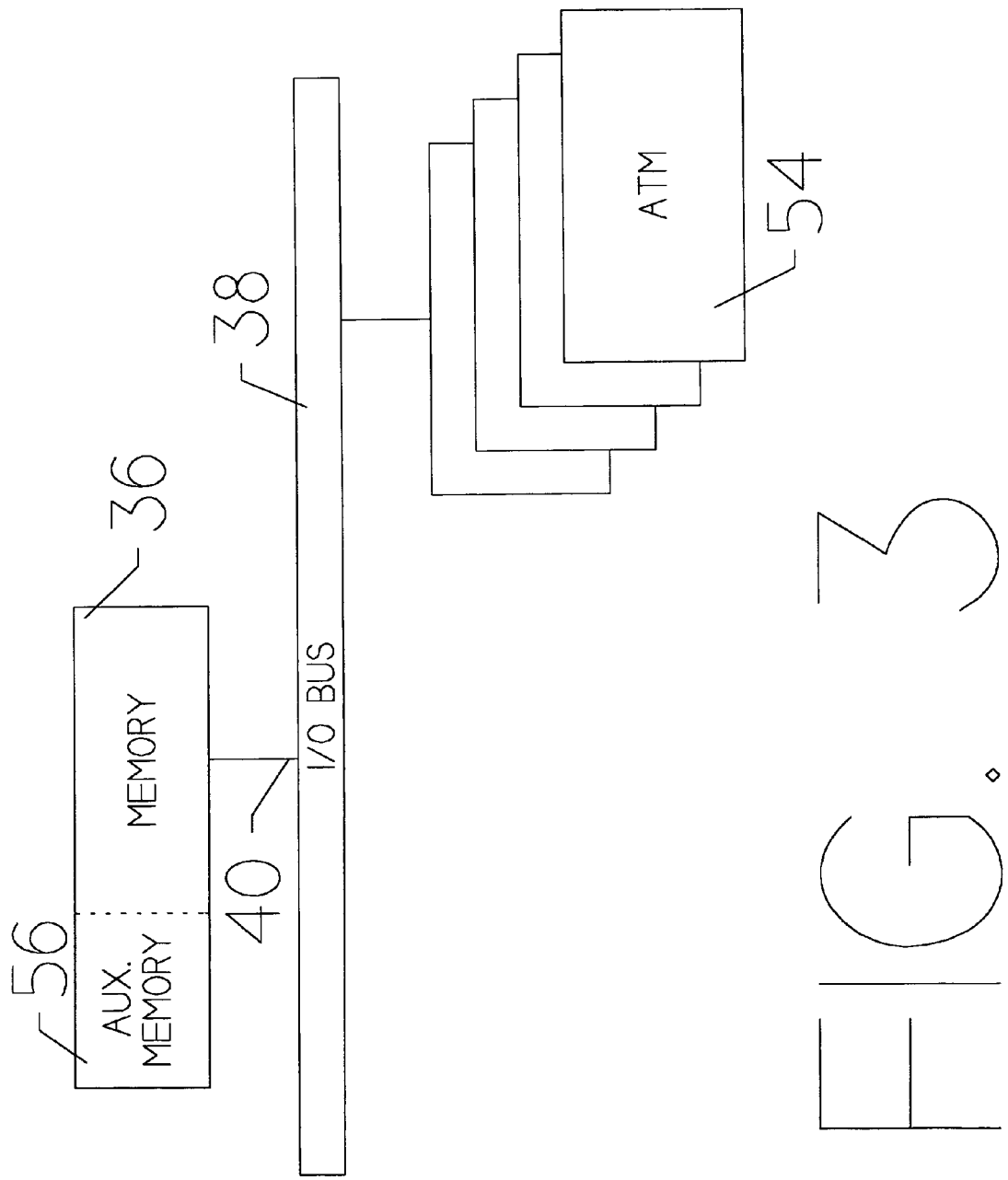
FIG. 3 is a schematic diagram showing the generation of a video stream from spooled data within a memory subsystem.

FIG. 3 is a schematic diagram showing spooling of high volume digitized video program. For those programs having a high user demand, it is much more efficient to spool the program files from random access memory rather than mass storage disk systems. In this context, high volume means a high probability that the given program will be in use during high service volume periods. That means that there will need to be random access storage allocated to the storage of that given program during peak memory demand. As a result, the system should simply allocate random access storage to that given program. Very popular, recent movies are typical of such high volume programs.

If a program is a high volume program, it is preferably stored in auxiliary memory 56, which is simply a portion of memory 36. Upon request, software residing in memory 36 directs the spooling of data from auxiliary memory 56 and transferring it via path 40 and I/O bus 38 to ATM interface 54. It should be noted that this is significantly more efficient than the spooling operation shown in FIG. 2, since the video data only needs to be read out of memory instead of having to be loaded from disk each time the data is used. Furthermore, there is no additional cost if a program is of sufficiently high volume that the required random access memory must be allocated to the program anyway.

Figure 4:
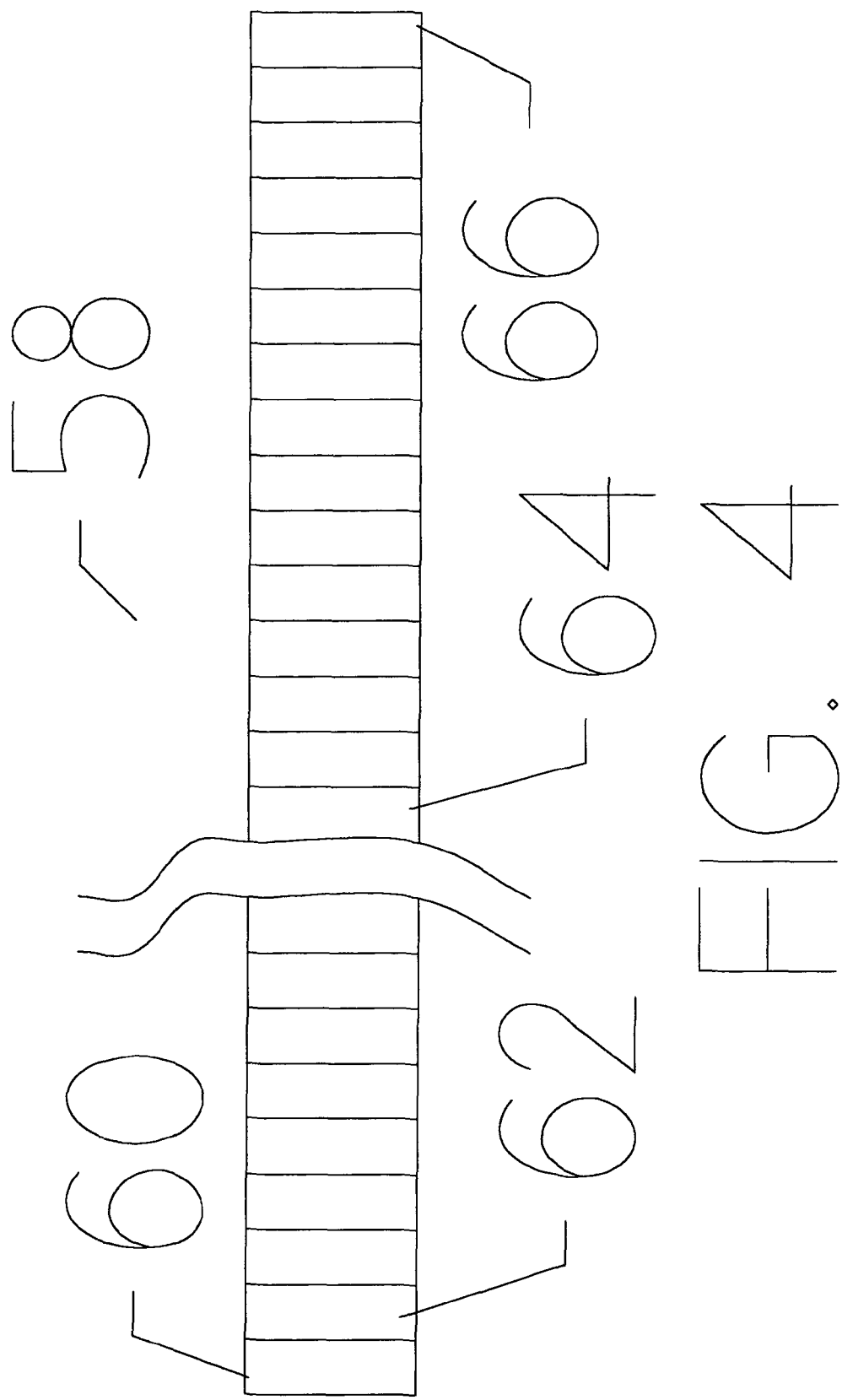
FIG. 4 is a schematic diagram showing video streaming as synchronized on one minute boundaries.

FIG. 4 is a schematic diagram 58 showing the synchronization of a given video program around one minute time slots. In concept, the present invention provides subscribers with video on demand. However, as a practical matter, by synchronizing multiple users around one minute time slots, the maximum number of reads from memory for all users of the given video program cannot exceed 60 per hour of programming and 120 for a two hour standard video program. That means that for a given high volume program (which may be requested by hundreds or even thousands within the length of time to view the program) each requester is assigned to an appropriate time slot. The one minute time interval is chosen arbitrarily as a compromise between system loading and subscriber wait. Other intervals may be more appropriate for given applications.

First time slot 60 provides the first minute of video programming to one or more requesters. During one minute time slot 62, the initial requesters receive the second minute of programming, and one or more requesters may be starting with the first minute of programming. At the nth time slot 64, the initial requesters are viewing the nth minute of programming, the second group of requesters is viewing the n-1 minute of programming, and the nth group of requesters is viewing the first minute of programming. At final time slot 66, the initial requesters are viewing the final minute of programming, the second group of requesters is viewing the second to last minute of programming, and a new group of requesters is viewing the initial minute of programming.

The reduction in total data requirements utilizing these one minute time slots is substantial. The total delay to a requester is no more than one minute and will average one half minute, making the process perfectly acceptable and barely noticeable to the subscribers.

Figure 5:
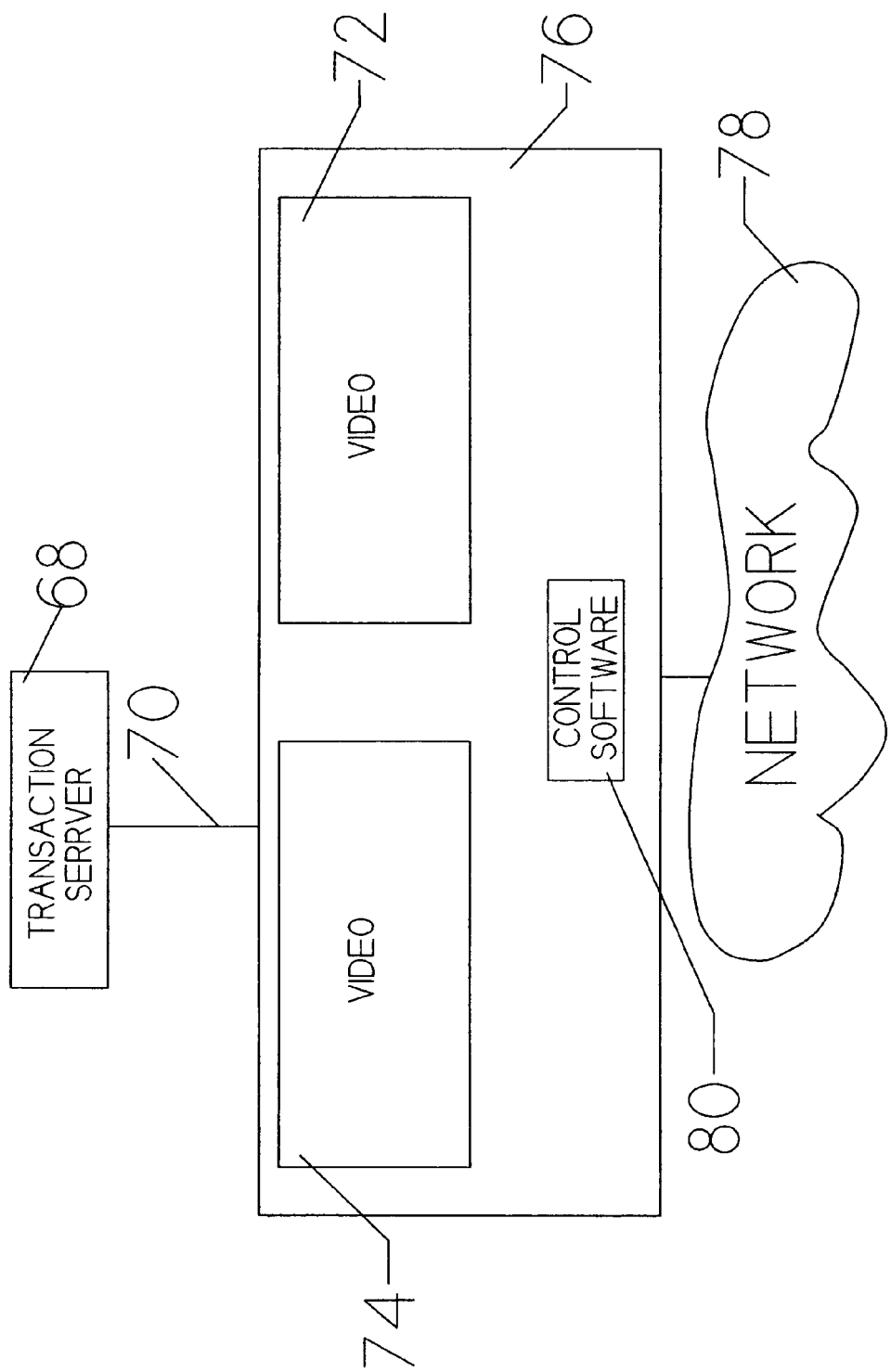
FIG. 5 is a schematic diagram showing operation of a video server platform.

FIG. 5 is a schematic diagram of a single industry compatible, Windows NT based video server platform. The video server subsystem is composed of a number of separate and largely independent video server platforms. Each is configured to have a maximum memory configuration and maximum I/O configuration. Digitized video programming data in the MPEG-2 format are spooled from transaction server 68 via interconnect 70 into the assigned video server platform. Video 74 and video 72 are shown. These videos are place onto network 78 under control of transmission control software 80 for transfer to the requesting subscriber(s). For a given video being sent to a single user, transmission control software 80 simply retrieves the video data from memory in a sequential fashion at 3 mbits/second and places it on network 78.

Figure 6:
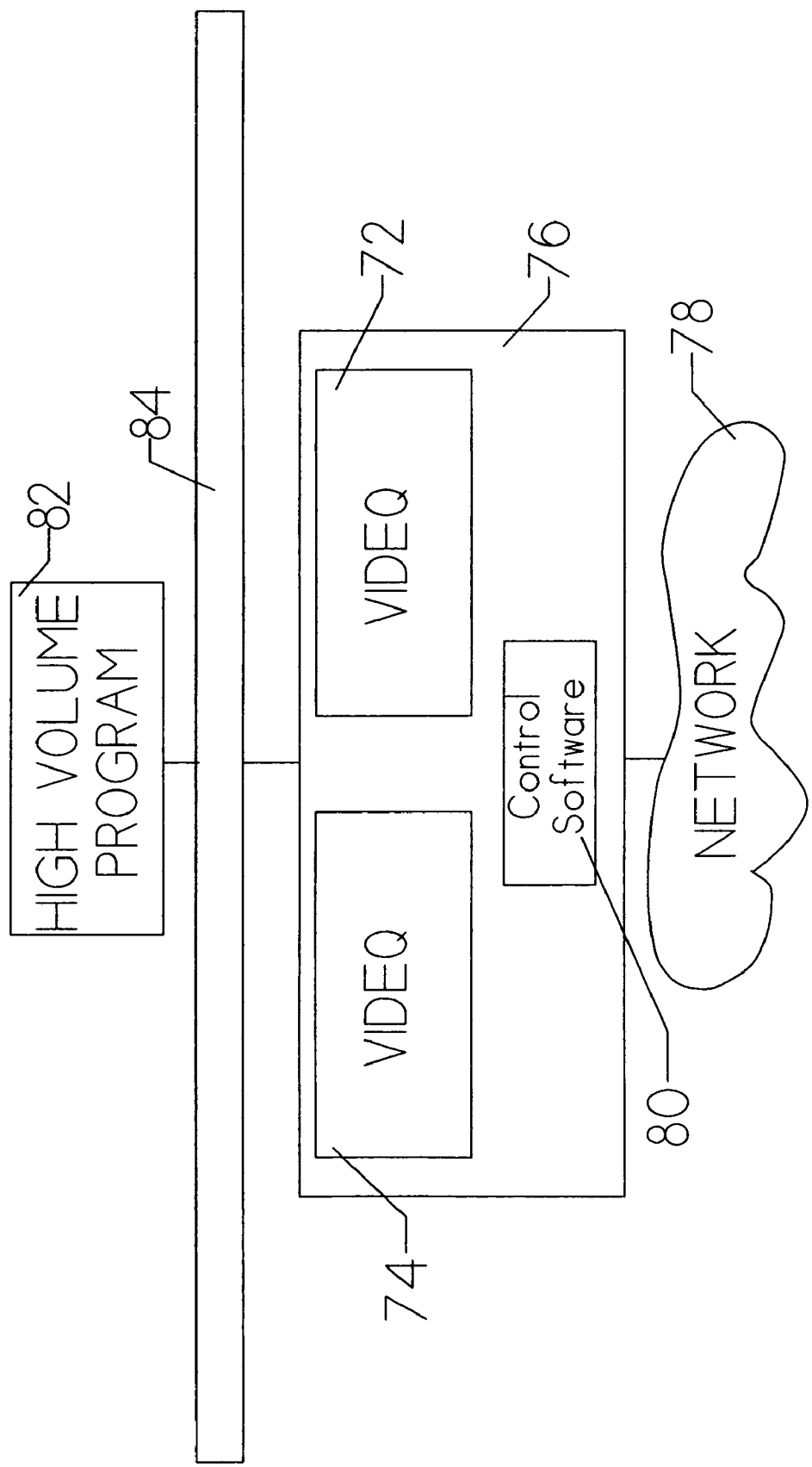
FIG. 6 is a schematic diagram showing video streaming of multiple programs from a single video server platform.

FIG. 6 is a schematic diagram showing spooling of high volume program 82 into the video server platform of FIG. 5. The spooling is performed by the transaction server as discussed above. The spooled data is transferred to the video server platform via interconnect 70 Up to ten programs can be stored and streamed from a single video server For simplicity, only one video server is shown. For a view of multiple video servers within a system, refer to FIG. 1. All other referenced elements are as previously described.

Figure 7:
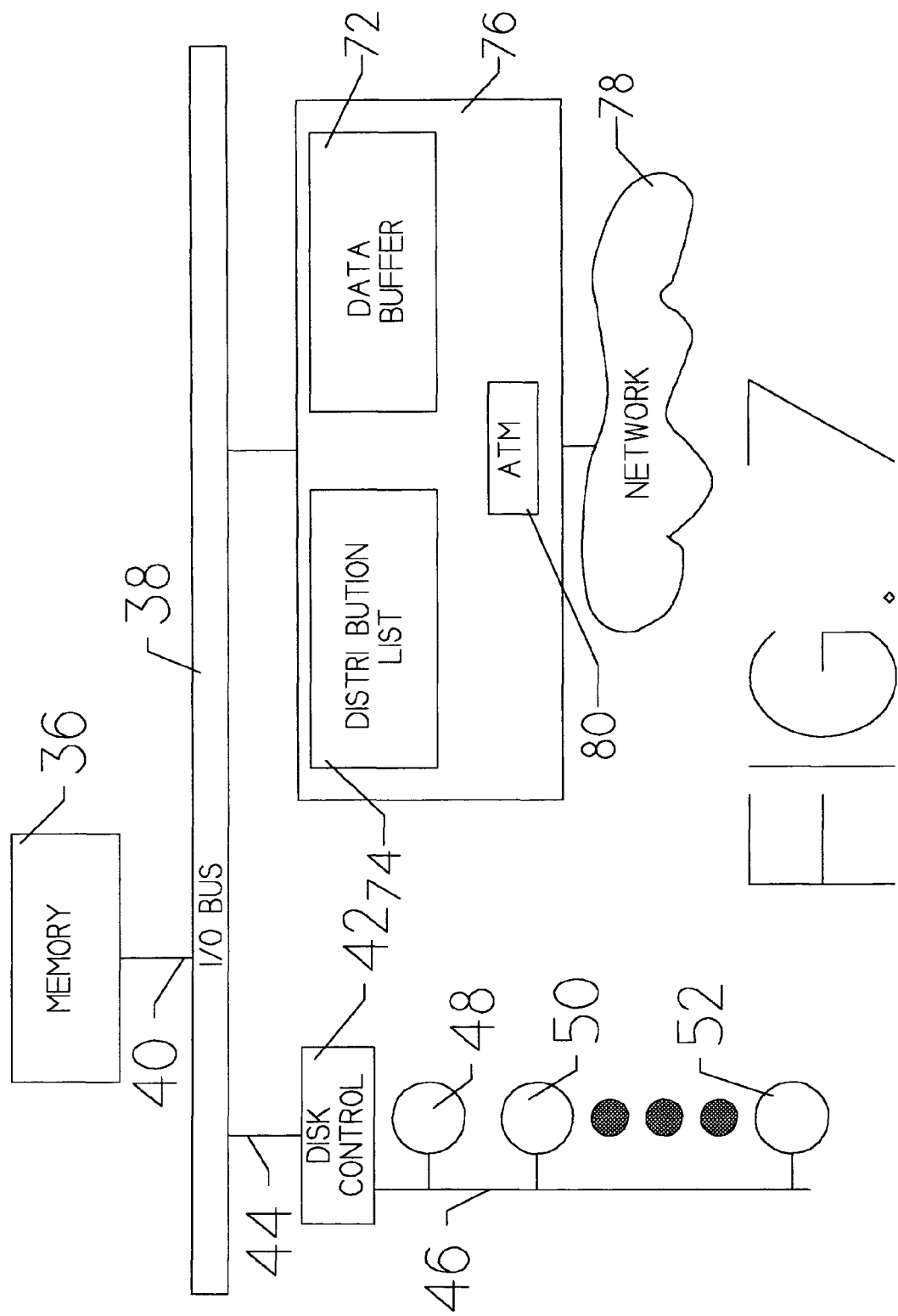
FIG. 7 is a schematic diagram showing video streaming from video programming data spooled on disk drive mass storage units.

FIG. 7 is a schematic diagram showing the spooling of low to moderate volume digitized video program data. For lower volume programs, storage on disk storage mass memory may be appropriate. A low volume video program is one in which it is highly unlikely that more than a small number of requests are received during the runtime of the video program. Therefore, the servicing of the request is most probably an index sequential task for retrieving the data and transmitting it to the user. This is readily distinguishable from the high volume video programs for which transmissions within multiple and perhaps many of the one minute time slots is expected (see also FIG. 4). These programs are spooled to the video server platform as shown. The remaining referenced elements are as previously described.

Figure 8:
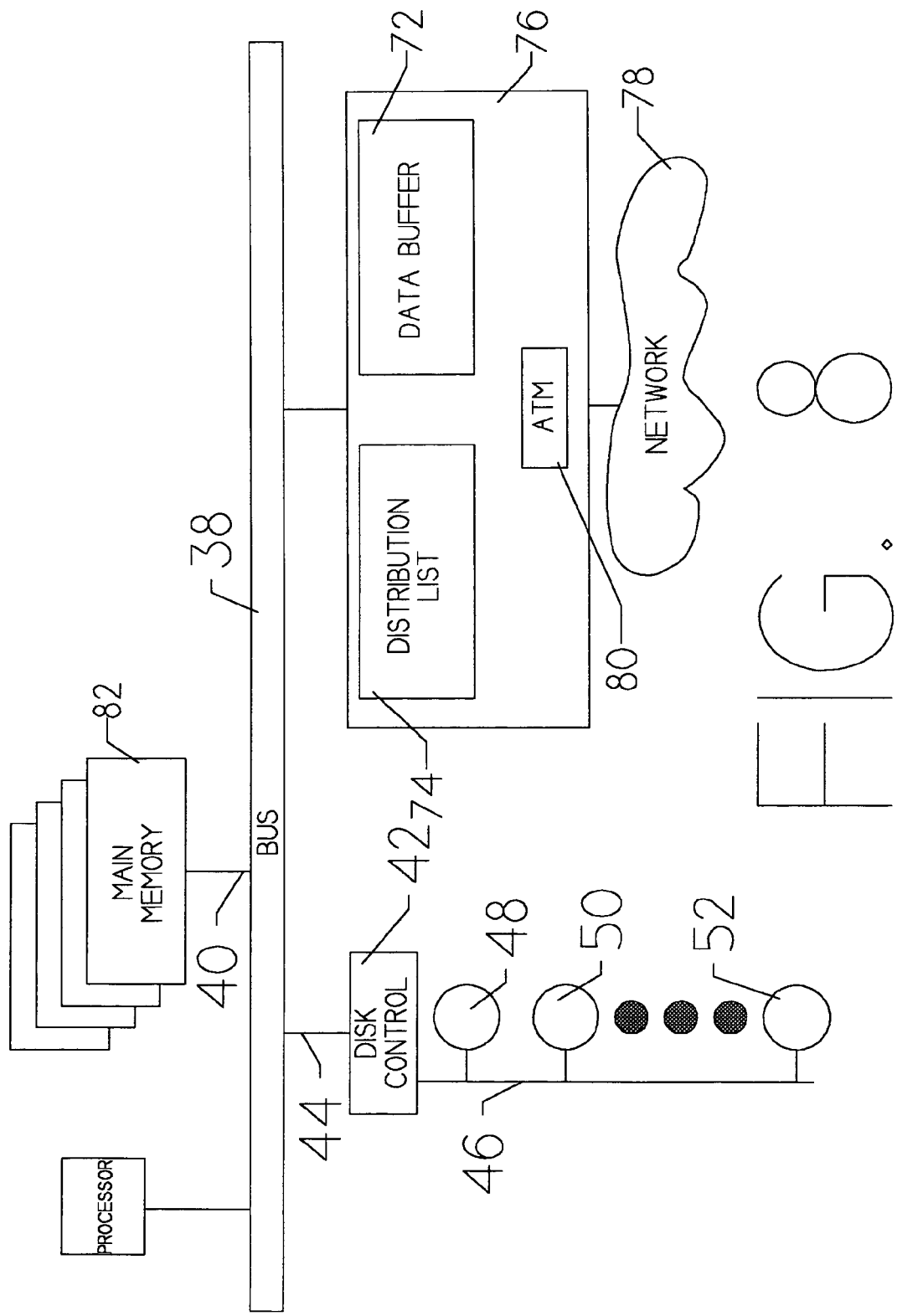
FIG. 8 is a schematic diagram showing video streaming from video programming data stored on both disk drive mass storage units and memory subsystems.

FIG. 8 is a schematic diagram of a video server showing spooling of low and high volume video programs to the same video server platform. All referenced elements are as previously described.

Figure 9:
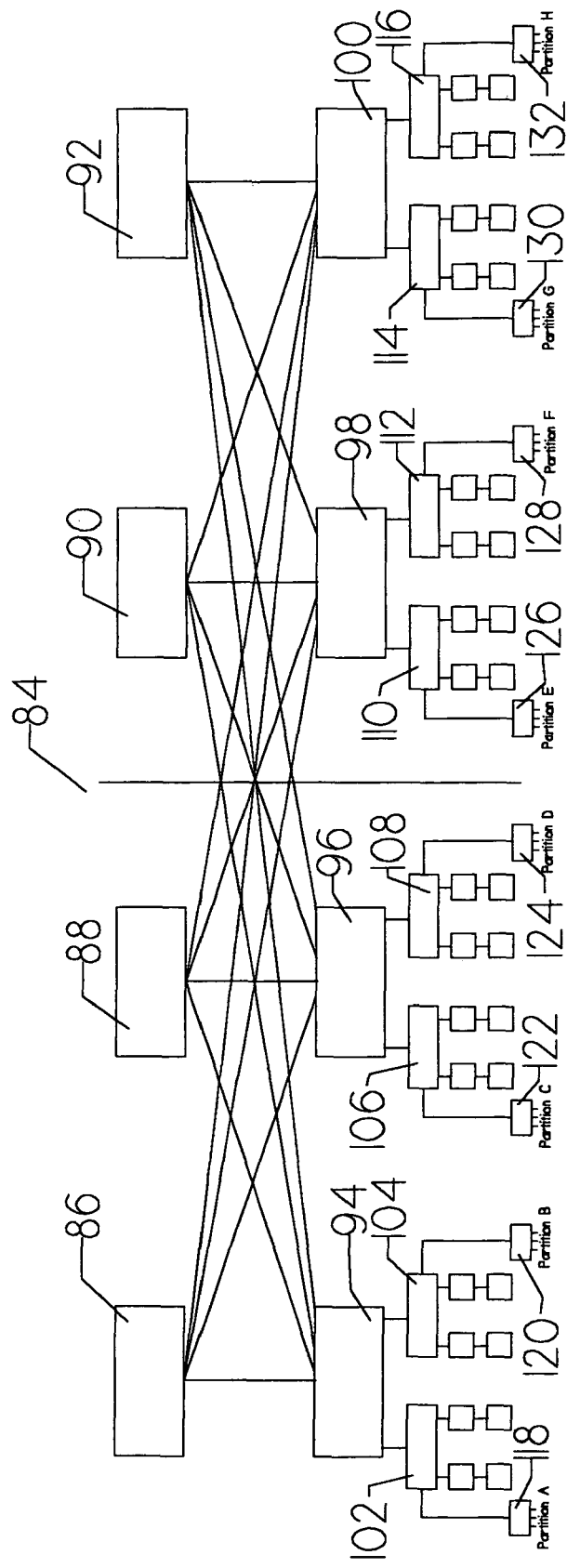
FIG. 9 is a block diagram of a maximum configuration video server.

FIG. 9 is a block diagram 84 of the maximum configuration of the video server of the preferred mode of the present invention. In this preferred mode, the video server is implemented using a current model Unisys mainframe system. In accordance with this product, the system is expandable from a single processor, single main memory, and single I/O controller to the maximum system shown.

The instruction processors communicate with third level caches 102, 104, 106, 108, 110, 112, 114, and 116 which in turn communicate with main memories 86, 88, 90, and 92 via crossbar interconnects 94, 96, 98, and 100. Each instruction processor may be coupled with a third-level caches, as shown. Direct Input/Output bridges 118, 120, 122, 124, 126, 128, 130, and 132 each handle video input/output functions. Each of the direct Input/Output bridges may be partitioned into separate partitions as shown. Additional description of partitioning may be found in U.S. patent application Ser. No. 08/779,472, filed Jan. 7, 1997, commonly assigned to the present invention and incorporated herein by reference.

Figure 10:
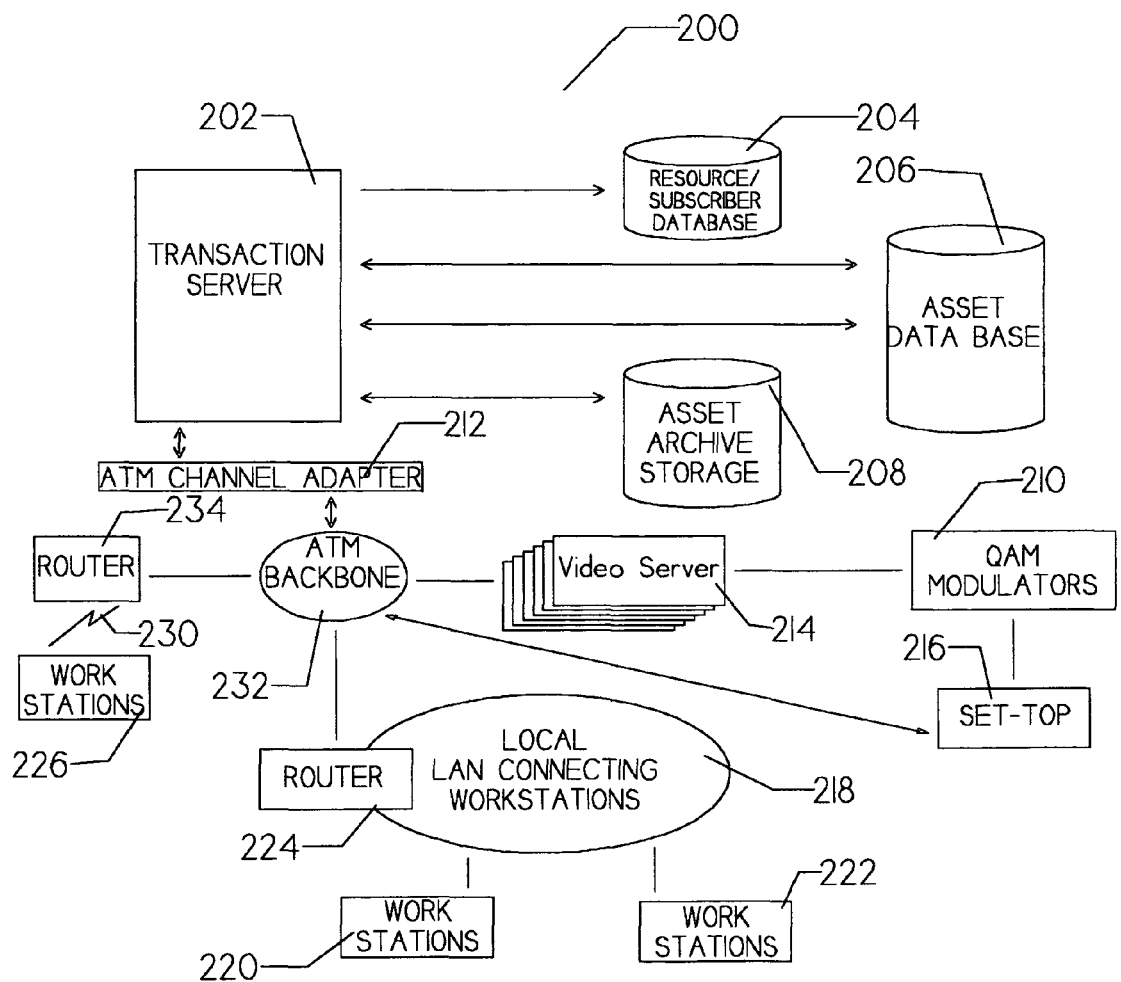
FIG. 10 is a detailed diagram showing the functional operation of the transaction gateway.

FIG. 10 is a detailed diagram 200 showing operation of the transaction server. Set-top 216 represents the subscriber box located at one of the subscriber locations. A video on demand request is made through the cable network and ATM backbone 232 to ATM channel adapter 212. The request arrives at transaction gateway 202. The initial account verification and subscriber fee management is processed utilizing resource/ subscriber database 204. If the request is to be honored (i.e., subscriber account is in proper order and requested video program is available), the requested digitized video program is accessed for spooling.

Active video programming is stored within asset data base 206 for rapid access. Low volume video programming is likely to be found on asset archive storage 208. When accessed, the digitized video programming data is streamed in MPEG-2 format through ATM channel adapter 212 and video servers 214 to QAM modulators 210 for transfer to the subscriber via set-top 216.

Because the video programming data is stored and transferred in MPEG-2 digital format, requests for programming, display of programming data, and other transactions may be conducted with other personal computer platforms, such as work stations 220, 222, and 226. By way of example and not to be deemed as limiting of the present invention, work stations 226 interface to the video on demand system via wireless link 230 and router 234, which may be via radio frequencies, satellite, or other convenient interface. Similarly, work stations 220 and 222 are coupled via local area network 218 and router 224 to ATM backbone 232.

Those of skill in the art will be readily able to appreciate that the video on demand system of FIG. 10 may supply entertainment programming to subscriber boxes, such as set-top 216, and also supply business and educational programming to work stations, as shown.

Figure 11:
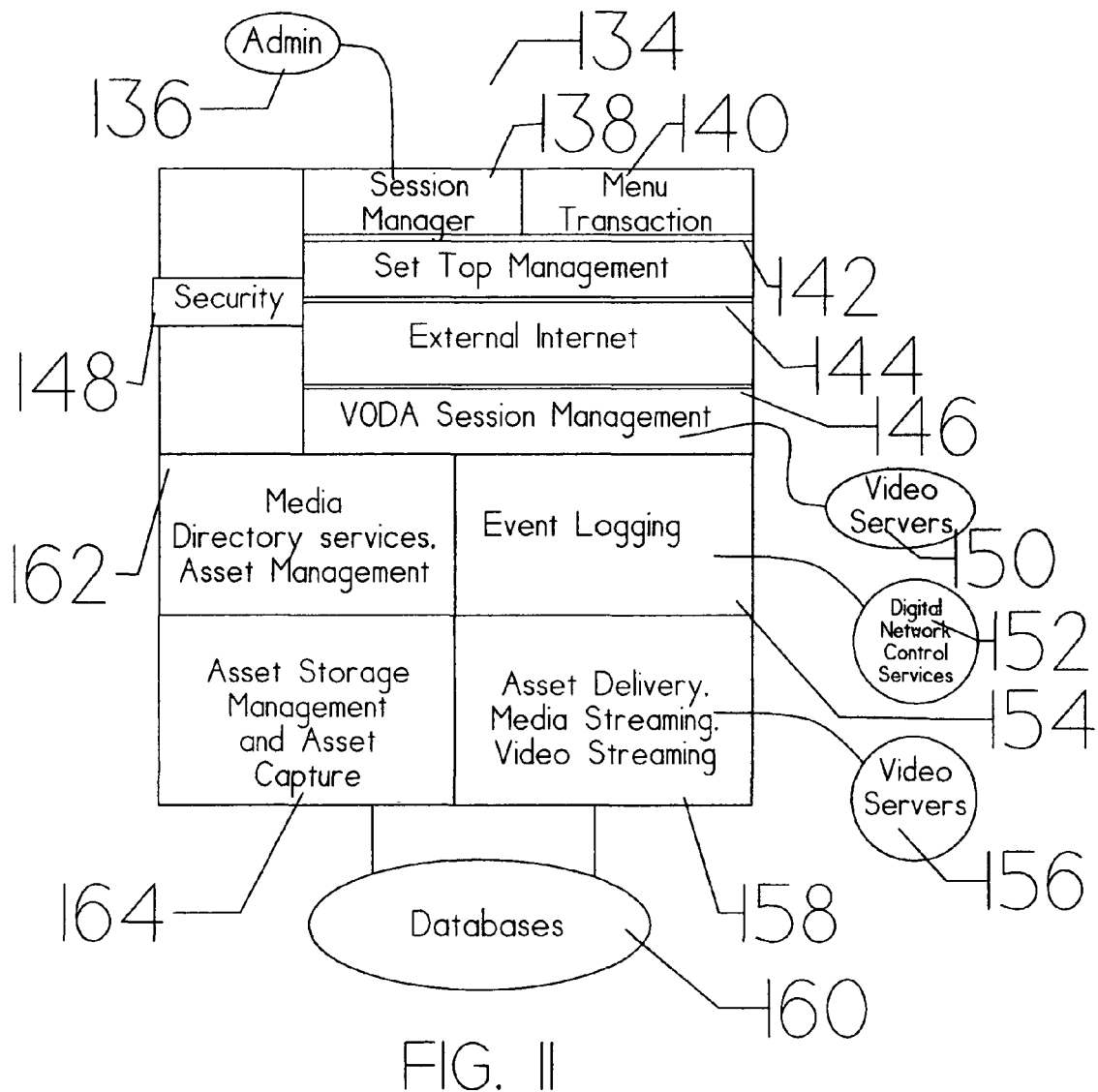
FIG. 11 is a detailed diagram of the operation of the transaction server of the present invention.

FIG. 11 is a detailed functional diagram 134 of the transaction server. Communication with subscriber box 32 (see also FIG. 1) is managed by set top management module 142. Initial requests are selected by the user and honored through utilization of menu transaction module 140. After initiation of the servicing of a given request, control of the matter is given to session manager 138 for completion. Any and all communication with the transaction server are monitored by security module 148. Administration module 136 provides overall control of the transaction server.

The transaction server may be utilized to interface with the internet. The selected hardware and software system selected for the preferred mode provide internet server facilities in a commercially usable form. Video server session management module 146 provides the detailed functions (e.g., spooling of digital video programming) associated with the primary video on demand service. These control functions are directly interfaced to the video server subsystem via video server interface 150.

Event logging module 154 journals the functions performed. This log is made available to digital network control services 152. Media directory services and asset management module 162 provides long term control and asset management. Historical storage of these data is performed by asset storage management and asset capture.

In performing the actual video on demand service, the appropriate requested digitized video program is accessed from databases 160. It is spooled by asset delivery, video streaming module 158. The transfer is made via video server interface 156 (see also FIG. 1).

Figure 12:
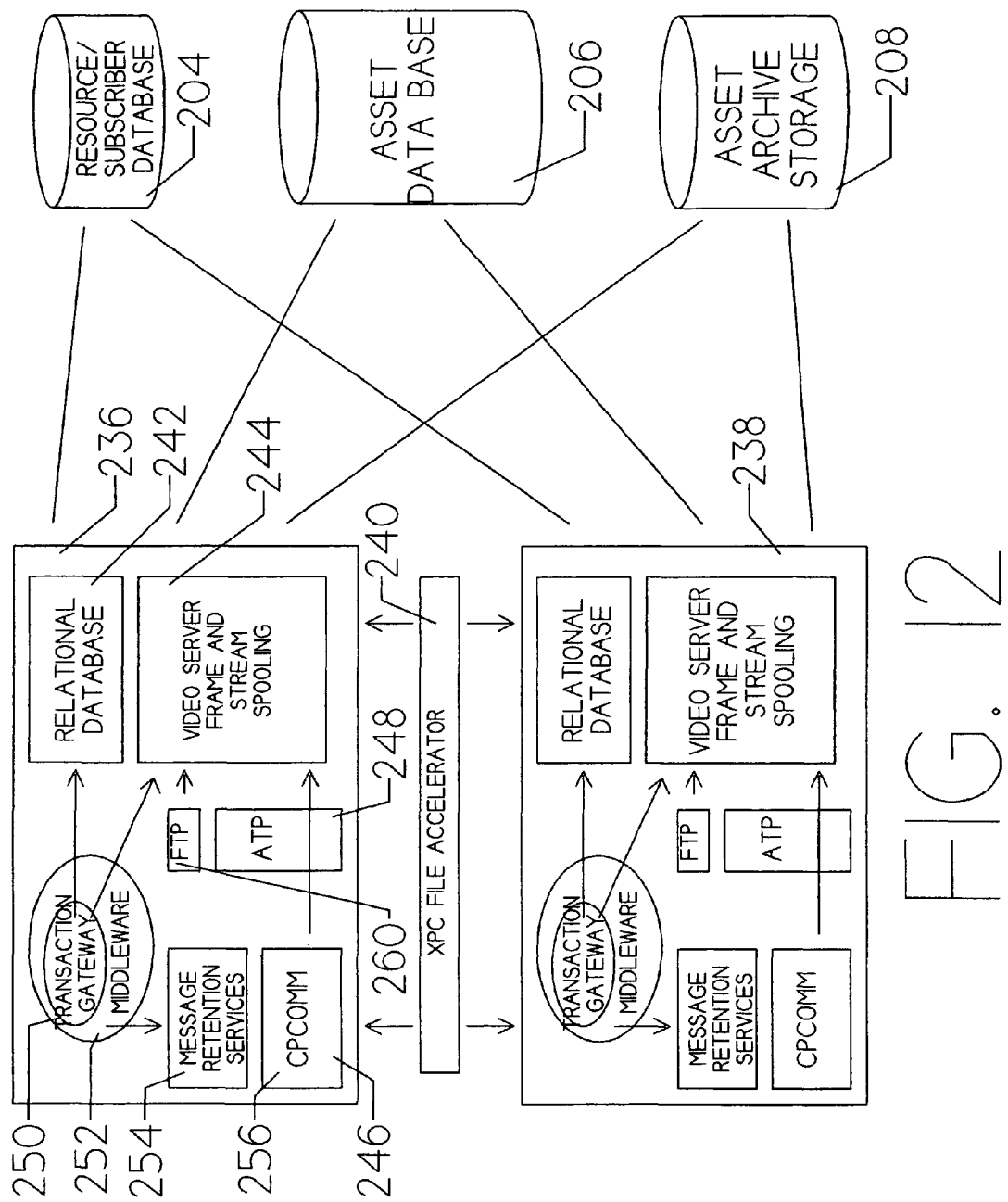
FIG. 12 is a detailed diagram showing the operation of a preferred, highly redundant transaction server subsystem implemented within a large scale Unisys mainframe.

FIG. 12 is a detailed diagram of a single, high reliability, highly redundant mainframe system, such as Unisys mainframe computer, for providing both transaction server and video server functions. In this configuration, two identical partitions 236 and 238 provide the desired redundancy, essentially yielding 100 percent availability. Each partition communicates separately with resource/subscriber database 204, asset database 206, asset archive storage 208 and the network (not shown for simplicity). In that manner, each of the two partitions may perform all of the video on demand functions independently. XPC file accelerator 240 provides the needed communication between partitions when both are in operation. When one of the partitions is disabled by manual action or component failure, the other partition continues to operate.

Partition 236 (and identical partition 238) contains a number of component elements. Transaction gateway 250 is the software module which provides the direct functional interface between the subscriber and the video on demand system. Transaction gateway 250 operates within the environment of standard Unisys middleware 252. Relational database 242 provides efficient access to subscriber and asset data base entries. Message retention services 254 enables recovery of message data.

Transaction gateway 250 directs video server frame and stream spooling module 244 to spool and stream the requested video program. Communication and frame timing are provided by FTP 260 and ATP 248. CPCOMM 246 performs the standard communication management functions.

Having thus describe the preferred embodiments in detail, those of skill in the art will be readily able to use the teachings found herein to make and use yet other embodiments within the scope of the claims appended hereto.

What is claimed is:

1. In a video on demand system for supplying video data to a plurality of subscriber receivers via a program delivery network, the improvement comprising:
   a. A data base storage system containing a plurality of video on demand programs;
   b. A temporary video storage memory;
   c. A transaction server directly coupled to said data base storage system, said temporary video storage memory, and said plurality of subscriber receivers whereby each of said plurality of subscriber receivers requests a different video on demand program from said transaction server and said transaction server spools said different video on demand programs from said data base storage to said temporary video storage memory wherein said transaction server further comprises a transaction gateway software module operating in a middleware environment and a video server frame and stream spooling program responsively coupled to said transaction gateway via said middleware environment and wherein each of said plurality of video servers further comprises an industry compatible personal computer;
   d. A plurality of video servers directly coupled to said transaction server and said temporary video storage memory and responsively coupled to said plurality of subscriber receivers via said program delivery network wherein said plurality of video servers are assigned by said transaction server to stream said spooled different video on demand programs from said temporary video storage memory to said plurality of subscriber receivers via said program delivery network; and
   e. A mainframe computer platform hosting said transaction server responsively coupled to said one of said plurality of video servers and said subscriber receiver.

2. The video on demand system of claim 1 wherein said mainframe computer platform further comprises a Unisys mainframe computer system.

3. The video on demand system of claim 2 wherein said transaction server spools said video on demand program in the MPEG-2 format.

4. An apparatus comprising:
a. A plurality of subscribing receivers each capable of providing a plurality of service requests;
b. A data base storage system which stores a plurality of video programs;
c. A temporary digital memory storage device;
d. A Unisys computer system transaction server directly coupled to said plurality of subscribing receivers, said temporary digital memory storage device, and said data base storage system capable of receiving said plurality of service requests, accessing said plurality of video programs corresponding to said plurality of service requests from said data base storage system, and spooling, in MPEG-2 format, said plurality of video programs into said temporary digital memory device in response thereto, wherein said transaction server further comprises a subscriber account whereby each of said plurality of subscribing receivers is charged for corresponding ones of said plurality of service requests; and
e. A plurality of video servers directly coupled to said transaction server, said temporary digital memory storage device, and said plurality of subscribing receivers wherein said transaction server assigns one of said plurality of video servers to stream said spooled plurality of video programs from said temporary digital memory device to said plurality of subscribing receivers.

5. A video on demand system comprising:
a. Storing means for storing a plurality of video programs;
b. Plurality of subscriber boxes generating a plurality of different requested video on demand signals;
c. A transaction gateway comprising a Unisys mainframe computer system, directly coupled to said plurality of subscriber boxes and said storing means, adapted for identifying a number of said plurality of video programs stored within said storing means corresponding to said plurality of different requested video on demand signals and wherein said transaction gateway further comprises processing means for processing subscriber transactions;
d. Temporarily storing means for temporarily storing said plurality of different requested video on demand signals;
e. Spooling means directly coupled to said a transaction gateway, said temporarily storing means, and said storing means for spooling said corresponding number of said plurality of video programs from said storing means into said temporarily storing means which said a transaction gateway identifies; and
f. A plurality of streaming means directly coupled to said spooling means, said temporarily storing means, and said receiving means for streaming said spooled number of said plurality of video programs corresponding to said plurality of different requested video on demand signals from said temporarily storing means to said plurality of subscriber boxes wherein said spooling means assigns one or said plurality of streaming means to stream said spooled number of said plurality of video programs to said plurality of subscriber boxes.

6. A method providing video on demand services comprising:
a. Storing a plurality of video programs in a video storage facility;
b. Receiving a video on demand request from a subscriber at a transaction server;
c. Determining a one of said plurality of video programs corresponding to said video on demand request by said transaction server;
d. Spooling said one of said plurality of video programs corresponding to said video on demand request from said video storage facility into a temporary storage facility by said transaction server;
e. Assigning one of a plurality of video servers responsively coupled to subscriber to stream said one of said plurality of video programs corresponding to said video on demand request to said subscriber by said transaction server;
f. Streaming said spooled video program from said temporary storage facility by said assigned video server to said subscriber; and
g. Pausing said streaming in response to a pause signal from said subscriber to said transaction server.

7. A method according to claim 6 further comprising said streaming in response to a reverse signal from said subscriber to said transaction server.

8. A method according to claim 6 further comprising fast forwarding said streaming in response to a fast forward from said subscriber to said transaction server.

\* \* \* \* \*